J. N. BRUSH.
BUTTER WORKER.
No. 109,381. Patented Nov. 22, 1870.
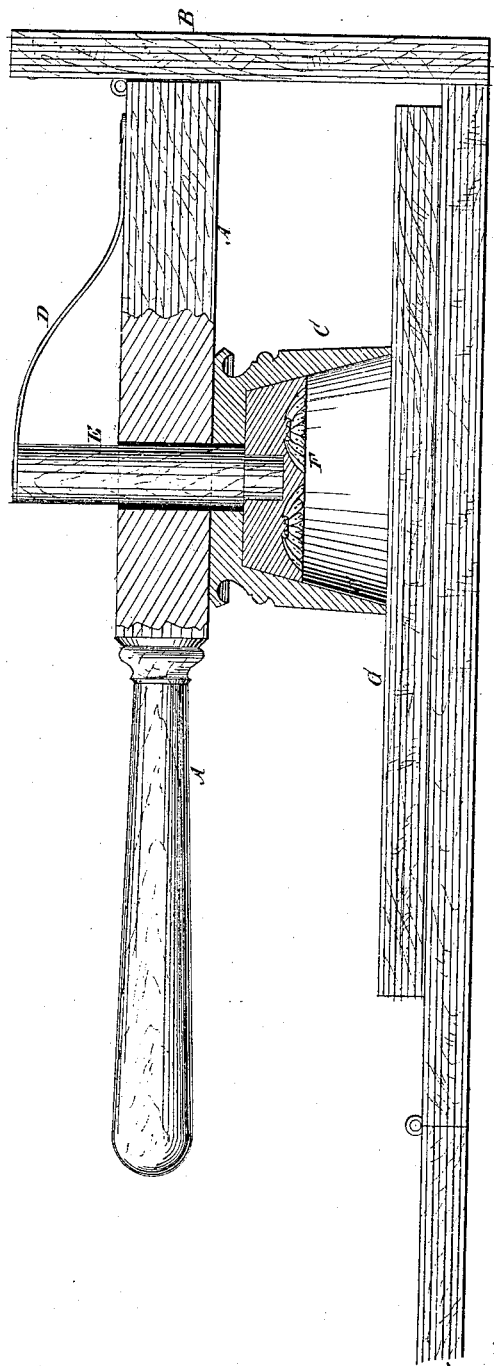

United States Patent Office.

JOSHUA N. BRUSH, OF EYOTA, MINNESOTA.

Letters Patent No. 109,381, dated November 22, 1870.

IMPROVEMENT IN BUTTER-WORKERS.

The Schedule referred to in these Letters Patent and making part of the same.

*To all whom it may concern:*

Be it known that I, JOSHUA N. BRUSH, of Eyota, in the county of Olmstead and State of Minnesota, have invented a new and Improved Butter-Worker; and I do hereby declare the following to be a full, clear, and exact description thereof, reference being had to the accompanying drawing forming part of this specification, in which the figure is a longitudinal vertical section.

My invention has for its object to provide a convenient and effective device for expressing the buttermilk from butter, and to this end it consists in the butter-worker constructed as I will now proceed to describe in detail.

In the accompanying drawing—

A is a horizontal lever, hinged at one end to a suitable upright, B, in any convenient location.

To the under side of this lever, at a point removed from its hinged end, is firmly secured a print-cup, C, as shown.

D is a bent spring, secured at one end to the upper side of the lever.

The free end of this spring is secured to a stem, E, which passes downward through the lever and the bottom of the print-cup, to receive the mold-disk or false bottom F contained therein, as shown.

By this construction, the mold-disk operates with a yielding pressure when the lever is depressed.

The print-cup may be made of glass or other suitable material, and of any proper size.

G is the butter-board, placed upon a suitable support, and adapted for removal.

The butter to be pressed or worked is placed upon this board, and the lever raised to permit the butter to pass under the cup. The lever is then depressed one or more times, forcing the butter within the cup and against the mold-disk F, which presses it with a yielding pressure, as previously mentioned.

By this arrangement the butter-milk is not only expressed from the butter, but the latter is formed into prints of a form corresponding to the interior configuration of the cup and the mold-disk.

Having thus described my invention,

What I claim as new, and desire to secure by Letters Patent, is—

The butter-worker, consisting of the hinged or pivoted lever A, carrying the inverted cup C and spring-mold F, all the parts being arranged as herein set forth, for the purpose specified.

JOSHUA N. BRUSH.

Witnesses:
JAS. S. NILES,
H. S. KNAPP.